US006819496B2

(12) United States Patent
Chevreau et al.

(10) Patent No.: US 6,819,496 B2
(45) Date of Patent: Nov. 16, 2004

(54) HEAD-UP DISPLAY FOR AIRCRAFT WITH A CURVED WINDSHIELD

(75) Inventors: Yannick Chevreau, Merignac (FR); Laurent Bignolles, Bordeaux (FR); Jean-Marc Darrieux, Bordeaux (FR)

(73) Assignee: Thales, Paris (FR)

( * ) Notice: Subject to any disclaimer, the term of this patent is extended or adjusted under 35 U.S.C. 154(b) by 239 days.

(21) Appl. No.: 10/168,965

(22) PCT Filed: Nov. 13, 2001

(86) PCT No.: PCT/FR01/03545
§ 371 (c)(1),
(2), (4) Date: Jun. 25, 2002

(87) PCT Pub. No.: WO02/41035
PCT Pub. Date: May 23, 2002

(65) Prior Publication Data
US 2003/0011536 A1 Jan. 16, 2003

(30) Foreign Application Priority Data
Nov. 14, 2000 (FR) ............................. 00 14625

(51) Int. Cl.[7] ............................................. G02B 27/14
(52) U.S. Cl. ..................... 359/631; 359/630; 359/633
(58) Field of Search .................... 359/630, 631, 359/633, 13, 14, 15; 345/7

(56) References Cited

U.S. PATENT DOCUMENTS

| 5,479,294 A | 12/1995 | Darrieux et al. ............ 359/630 |
| 5,517,337 A | 5/1996 | Dupin et al. .................. 359/13 |
| 5,581,806 A | 12/1996 | Capdepuy et al. ............... 2/6.2 |
| 5,760,931 A * | 6/1998 | Saburi et al. .................. 359/13 |
| 6,078,428 A | 6/2000 | Rambert et al. ............ 359/632 |
| 6,157,471 A | 12/2000 | Bignolles et al. ............. 359/15 |
| 6,158,866 A | 12/2000 | Gulli et al. ................. 351/221 |
| 6,262,849 B1 | 7/2001 | Potin et al. ................. 359/631 |
| 6,356,393 B1 | 3/2002 | Potin et al. ................. 359/631 |

FOREIGN PATENT DOCUMENTS

| EP | 0 377 773 | 7/1990 |
| EP | 0 631 167 | 12/1994 |
| EP | 0 710 866 | 5/1996 |
| WO | 02/14941 | 2/2002 |

OTHER PUBLICATIONS

"Head–up display" The Electronic Engineer, vol. 26, No. 7, p. 29, Jul. 1967.

* cited by examiner

*Primary Examiner*—David N. Spector
(74) *Attorney, Agent, or Firm*—Oblon, Spivak, McClelland, Maier & Neustadt, P.C.

(57) ABSTRACT

A head-up sight for an aircraft having a curved windshield. The windshield is external to the sight, which can project at infinity a symbology intended to be superimposed onto an external scene. The head-up sight includes a combination of optical elements bent at an angle to a folding mirror, the folding mirror having a curved shape adapted to correct the parallax associated with the optical power of the windshield. The head-up sight is especially applicable to aircraft having a cylindrical or conical windshield.

11 Claims, 2 Drawing Sheets

PRIOR ART FIG.1

HEAD-UP DISPLAY FOR AIRCRAFT WITH A CURVED WINDSHIELD

BACKGROUND OF THE INVENTION (1) Field of the Invention

The invention relates to the field of head-up sights for an aircraft with a curved windshield, that is to say for an aircraft having a windshield with a curved shape. The head-up sight is an optomechanical device which makes it possible to superimpose onto the external scene seen by the pilot of the aircraft, a symbology which is projected at infinity, that is to say far enough away that the pilot does not have to substantially accommodate in order to see said symbology. The symbology comprises, for example, synthetic images and reticules.

(2) Description of the Related Art

Where the windshield of the aircraft is flat, there is no particular difficulty for the head-up sight to superimpose the symbology projected at infinity onto the external scene. On the other hand, where the windshield of the aircraft is curved, although the symbology is projected at infinity, the target appears to the aircraft pilot to be closer than the symbology, which obliges the pilot to accommodate in order to pass from the symbology projected by the sight onto the scene, and vice versa. This phenomenon is called parallax. Specifically, since the shape of the windshield is curved, the windshield is not optically neutral, it is an optical element having a certain optical power, which is generally divergent since the windshield is curved and of constant thickness. It is because of the optical power of the windshield that the target appears to the pilot to be closer than the symbology projected at infinity by the head-up sight. Thus, when the pilot looks at the target, he sees the symbology slightly duplicated, for example, over a few milliradians, while when the pilot looks at the symbology, he sees the target slightly duplicated, for example over a few milliradians. This duplication disrupts the pilot's vision, for example when he has to align a reticule on a target during a firing phase in the case of a military aircraft.

According to a prior art, an example of which is shown in FIG. 1, the parallax associated with the curved windshield, more specifically, that is to say with the curved shape of the windshield, is corrected using an additional plate. This additional plate is a plano-cylindrical plate, placed outside the optical combination of the head-up sight, downstream of the last optical element of said optical combination, and mechanically integrated into the head-up sight, that is to say included in the external casing of the head-up sight. This additional plate for compensating the parallax associated with the curved windshield has several drawbacks. The addition of this additional plate comprising a generally opaque mounting constitutes, for the pilot's vision, a supplementary mask, generally of a few degrees, which leads to a reduction in the pilot's visual field, which is a problem for the pilot, and which risks cutting off information from the projected symbology, which is also annoying for the pilot. The inside of the head-up sight is generally also at a higher pressure with respect to the outside of the head-up sight, especially in order to prevent the ambient moisture from penetrating inside the head-up sight; it is therefore necessary, on the one hand, to reconcile the internal overpressure of the head-up sight and the mechanical rigidity of the additional compensation plate in order to eliminate the possibility of the additional compensation plate exploding and, on the other hand, to be able to rinse the supplementary volume due to the presence of the additional compensation plate using a fluid. This overpressure problem requires adaptations of the head-up sight which are sometimes difficult to implement.

FIG. 1 shows schematically the optical combination of a head-up sight according to the prior art for an aircraft with a curved windshield showing the effect of the curved windshield which is external to the sight. The direction of propagation of the light beams is indicated by arrows. Other optical elements are located between the curved windshield and the head-up sight, but are not shown in FIG. 1, since they have no optical power; for example, there are partly reflecting mirrors whose function is to superimpose the symbology projected at infinity by the head-up sight onto the external scene seen by the pilot. An additional plate 6 for compensating the parallax associated with the curved windshield 5 is located between the output of the optical combination which comprises optical elements 1, 2, 21, 22, 23, 3, 4, 41, 42, which will be described later in relation to FIG. 2, and the curved windshield 5. The folding mirror 3 is a simple flat mirror enabling the optical combination of the head-up sight to be bent at an angle in order to decrease its overall size.

BRIEF SUMMARY OF THE INVENTION

The invention provides a solution which, on the one hand, does not increase the visual mask of the pilot and which, on the other hand, requires little or no particular adaptation, especially of the external casing of the head-up sight and of the rinsing circuit inside the head-up sight. For this, the head-up sight according to the invention requires no additional compensation plate, since the parallax associated with the curved windshield is corrected by a particular shape of the folding mirror included in each optical combination of a head-up sight. Thus, it is not necessary to add a supplementary optical element, the modification of the shape of an optical element already existing in the optical combination of a head-up sight, that is to say the folding mirror, being enough to correct the parallax associated with the curved windshield, and even to remove this parallax.

According to the invention, provision is made for a head-up sight, for an aircraft with a curved windshield, the windshield being external to the sight, which can project at infinity a symbology intended to be superimposed onto the external scene, comprising a combination of optical elements bent at an angle to a folding mirror, characterized in that the folding mirror has a curved shape adapted to correct the parallax associated with the optical power of the windshield.

BRIEF DESCRIPTION OF THE DRAWINGS

The invention will be better understood and other particular features and advantages will become apparent using the description below and the appended drawings, given by way of examples, where.

DETAILED DESCRIPTION OF THE INVENTION

Figure 1:
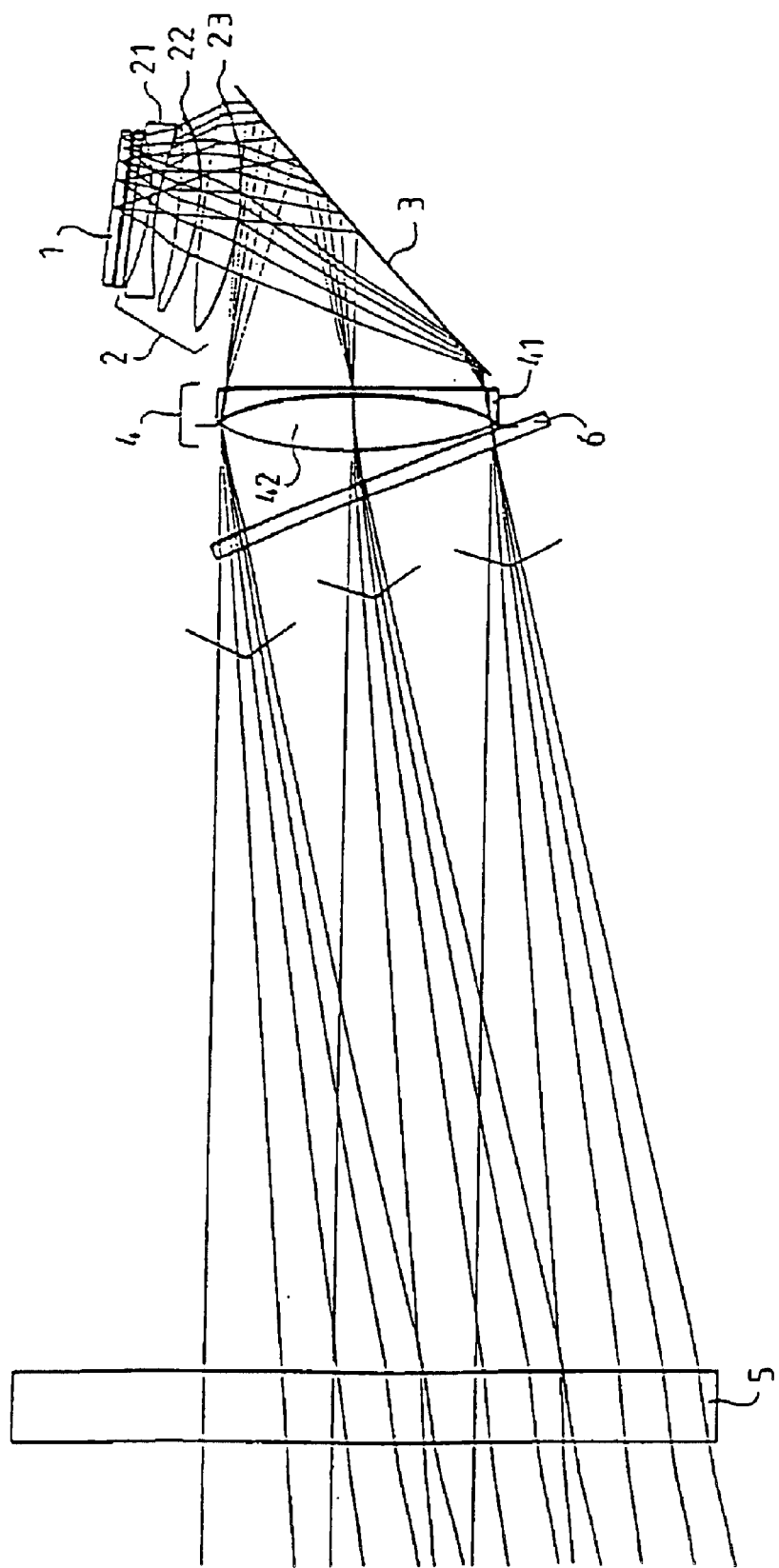
FIG. 1 shows schematically the optical combination of a head-up sight according to the prior art for an aircraft with a curved windshield showing the effect of the curved windshield which is external to the sight.

The head-up sight-according to the invention is a sight for an aircraft with a curved windshield. This head-up sight can project at infinity a symbology intended to be superimposed onto the external scene seen by the pilot. This head-up sight comprises a combination of optical elements also called an optical combination. This combination of optical elements comprises a folding mirror to which the optical combination is bent at an angle. The folding mirror has a curved shape which is adapted to correct the parallax associated with the curved windshield. The parallax associated with the curved windshield is therefore corrected by the folding mirror, or more specifically, by the adapted curved shape the folding mirror.

The head-up sight according to the invention has several advantages. First of all, the parallax associated with the curved windshield is corrected or even removed since it is compensated, completely or at least substantially, by the adapted curved shape of the folding mirror, and this without substantial degradation of the optical performance of the head-up sight. So, compared with a conventional optical combination of a head-up sight, it is not necessary to add a supplementary element such as the additional compensation plate of the prior art which increases the visual mask which is annoying for the pilot. Next, a single component, the folding mirror, needs to be modified in order to include the complete or at least substantial compensation of the parallax associated with the curved windshield, it being possible for the other optical elements of the conventional optical combination of a head-up sight to remain unchanged, which on the one hand allows the use of just one optical combination architecture which can be adapted to several different shapes of curved windshield and on the other hand renders the invention particularly beneficial during the retrofitting of an aircraft. The method of retrofitting an aircraft comprising a head-up sight and having a curved windshield consists solely, in order to obtain an at least substantial compensation of the parallax associated with the curved windshield, in substituting a folding mirror of curved shape adapted to correct the parallax associated with the curved windshield for the existing flat folding mirror in the head-up sight according to the prior art. The few modifications needed for the sight and the absence of modifications needed outside the sight in the rest of the aircraft cockpit, render the solution of the invention particularly beneficial in the case of a retrofit, also called "modernization", of an aircraft the shape of whose windshield is curved. Of course, in this case, since the additional compensation plate is useless, if it still exists, it must be removed from the head-up sight of the aircraft which is retrofitted.

The head-up sight according to the invention preferably comprises a cathode-ray tube creating the symbology and an optical combination making it possible to project this symbology at infinity, so as to be seen at infinity by the pilot. The head-up sight preferably comprises successively, from the cathode-ray tube to the optical output of the head-up sight, a rear group, the folding mirror and a front group. Generally, the front group provides the power performance and corrects part of the chromatism, while the rear group provides the image quality performance in the field and corrects most of the aberrations.

Figure 2:
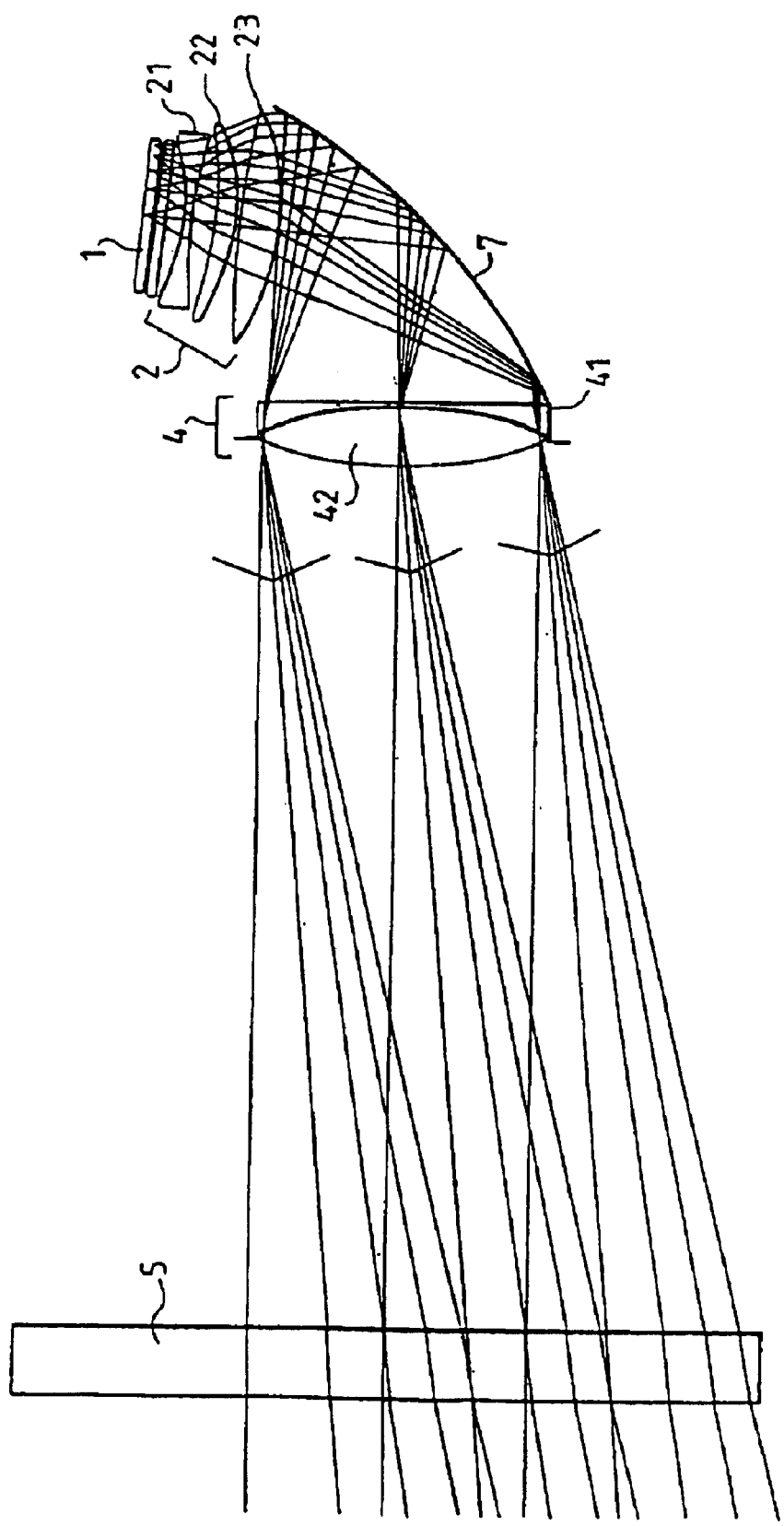
FIG. 2 shows schematically the optical combination of a preferred example of a head-up sight according to the invention for an aircraft with a curved windshield showing the effect of the curved windshield which is external to the sight (the scale of FIGS. 1 and 2 is about 1/3).

FIG. 2 shows schematically the optical combination of a preferred example of a head-up sight according to the invention for an aircraft with a curved windshield showing the effect of the curved windshield which is external to the sight. The direction of propagation of the light beams is indicated by arrows. Other optical elements are located between the curved windshield and the head-up sight, but are not shown in FIG. 1, since they are of no benefit to the invention, these are for example partly reflecting mirrors whose function is to superimpose the symbology projected at infinity by the head-up sight onto the external scene seen by the pilot. The head-up sight comprises a cathode-ray tube 1 emitting the symbology which will be projected at infinity by the optical combination of the head-up sight, which combination comprises several optical elements or groups of optical elements, namely a rear group 2 which comprises three lenses 21, 22 and 23, a front group 4 which is a doublet consisting of two lenses 41 and 42 fastened to each other and a folding mirror 7 to which the optical combination is bent at an angle. The mirror 7 has a curved shape which is adapted so as to compensate, completely or at least substantially, the parallax associated with the curved shape of the curved windshield 5 which does not belong to the head-up sight.

The folding mirror 7 is preferably concave at its reflecting surface, that is to say seen from the side of the light beams. This is because a concave folding mirror 7 is a converging optical element making it possible to compensate at least substantially for the divergent optical power of the windshield which is generally curved and of constant thickness.

In one embodiment, the shape of the folding mirror 7 is preferably conical. The associated windshield 5 is then preferably also of conical shape. The parallax associated with the cone-shaped windshield 5 may then be completely compensated.

In another preferred embodiment, the shape of the folding mirror 7 is preferably cylindrical. In this case, the shape of the associated windshield is preferably either cylindrical or conical. In the case of a cylinder-shaped windshield 5, the parallax compensation may be complete. In the case of a cone-shaped windshield 5, the parallax compensation cannot be complete, it will only be substantial. This is because, in the case of a cone-shaped windshield 5, the cylindrical shape of the folding mirror 7 will slightly overcompensate part of the exit pupil of the head-up sight while it will slightly undercompensate the other part of this exit pupil of the head-up sight. In the latter case for example, the compensation of the parallax associated with the curved windshield is only substantial. A cylinder-shaped folding mirror 7 has the advantage of being easier to manufacture than a cone-shaped folding mirror 7. The cylindrical shape of the folding mirror 7 has a radius of curvature which advantageously is several meters, for example between 5 m and 20 m.

The shape of the folding mirror 7 is preferably of the same type as that of the curved windshield whose parallax it corrects. For example, if the windshield 5 is conical, the folding mirror 7 will be conical, and if the windshield 5 is cylindrical, the folding mirror 7 will be cylindrical. The shape of the folding mirror 7 depends only on the shape of the windshield 5, it is independent of the rest of the optical elements of the head-up sight.

The folding mirror 7 advantageously consists of a glass plate on which a surface reflecting in the visible region is deposited. The light beams arrive directly onto the reflecting surface and are directly reflected by the reflecting surface without passing through the glass plate. The reflecting surface is preferably a metal coating. The reflecting surface is preferably multilayer so as to be, on the one hand, transparent in the infrared region and, on the other hand, reflecting in the visible region. Transparency in the infrared region makes it possible to prevent the formation of hot spots in the cathode-ray tube 1, which can damage the latter.

What is claimed is:

1. A head-up sight for an aircraft with a curved windshield external to the sight capable of projecting at infinity a symbology configured to be superimposed onto an external scene, the sight comprising:

a rear optical group;

a front optical group, said front optical group forming an optical output of the sight and being positioned at an angle with respect to said rear optical group; and a folding mirror positioned to deflect light from said rear optical group into said front optical group, wherein the folding mirror has a curved shape adapted to correct parallax associated with an optical power of the windshield.

2. The head-up sight as claimed in claim 1, wherein a shape of the folding mirror is the same as a shape of the windshield.

3. The head-up sight as claimed in claim 1, wherein the folding mirror is concave.

4. The head-up sight as claimed in claim 1, wherein a shape of the folding mirror is conical.

5. The head-up sight as claimed in claim 1, wherein a shape of the folding mirror is cylindrical.

6. The head-up sight as claimed in claim 5, wherein a radius of curvature of the folding mirror is several meters.

7. The head-up sight as claimed in claim 1, wherein the folding mirror includes a glass plate on which a surface reflecting in a visible region is deposited.

8. The head-up sight as claimed in claim 7, wherein the reflecting surface includes a metal coating.

9. A head-up sight for an aircraft with a curved windshield external to the sight capable of projecting at infinity a symbology configured to be superimposed onto an external scene, the sight comprising:

a combination of optical elements bent at an angle to a folding mirror, wherein the folding mirror has a curved share adapted to correct parallax associated with an optical power of the windshield, the folding mirror includes a glass plate on which a reflecting surface reflecting in a visible region is deposited, and the reflecting surface includes a multilayer configured to be transparent in an infrared region and reflecting in a visible region.

10. A head-up sight for an aircraft with a curved windshield external to the sight capable of projecting at infinity a symbology configured to be superimposed onto an external scene, the sight comprising:

a combination of optical elements bent at an angle to a folding mirror, wherein the folding mirror has a curved shave adapted to correct parallax associated with an optical power of the windshield, the head-up sight further comprises a cathode-ray tube, and the combination of optical elements comprises successively, from the cathode-ray tube to an optical output of the head-up sight, a rear group, the folding mirror, and a front group.

11. A method of retrofitting an aircraft including a head-up sight and having a curved windshield, said head-up sight comprising a combination of optical elements bent at an angle to a folding mirror having a curved shape adapted to correct parallax associated with an optical power of the windshield, the method comprising:

substituting a folding mirror of curved shape adapted to correct parallax associated with the windshield of the aircraft for an existing flat folding mirror in the head-up sight of the aircraft.

* * * * *